(No Model.)
J. W. BECWAR & D. SHAW.
WASHING MACHINE.
No. 531,089. Patented Dec. 18, 1894.
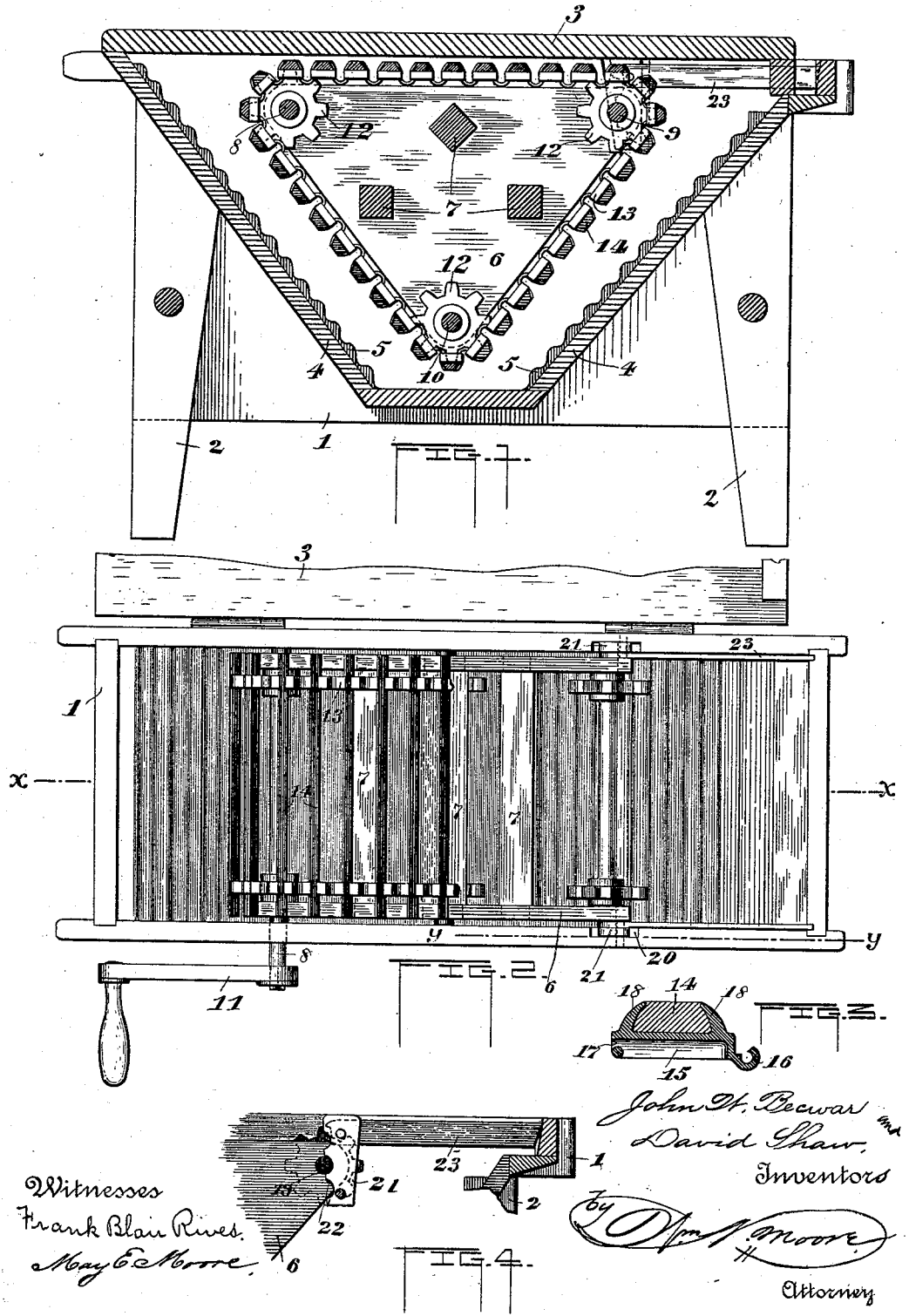

UNITED STATES PATENT OFFICE.

JOHN W. BECWAR, OF MILLBANK, SOUTH DAKOTA, AND DAVID SHAW, OF ORTONVILLE, MINNESOTA.

WASHING-MACHINE.

SPECIFICATION forming part of Letters Patent No. 531,089, dated December 18, 1894.

Application filed April 16, 1894. Serial No. 507,737. (No model.)

*To all whom it may concern:*

Be it known that we, JOHN W. BECWAR, residing at Millbank, in the county of Grant and State of South Dakota, and DAVID SHAW, residing at Ortonville, in the county of Big Stones and State of Minnesota, citizens of the United States, have invented certain new and useful Improvements in Washing-Machines; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in washing machines, and the object of our invention is the provision of a washing machine which will possess merit in point of simplicity, durability and inexpensiveness; which will wash the clothes perfectly without damaging them and which will not fatigue the operator thus embodying the features to render the machine practical and useful.

The invention consists of a washing machine comprising a stationary rubbing surface and a tri-angular frame carrying an endless rubbing surface and mechanism for moving the said rubbing surface to effect the washing of the clothes between the two surfaces.

The invention also consists of a washing machine comprising a casing having inclined walls, rubbing boards secured to said surfaces, a tri-angular frame pivoted at one corner to the casing, shafts mounted in said frame and carrying sprocket wheels, a sprocket or sprocket chains carrying rubbing slats and traveling on the wheels and mechanism for moving the chains with the rubbing slats.

The invention also consists in certain improvements in the construction and combination of parts of the washing machine as will appear from the following description and accompanying drawings.

Figure 1 is a vertical sectional view of our machine taken on the line x—x in Fig. 2. Fig. 2 is a top plan view of the machine with the lid or cover thrown back to show interior mechanism. Fig. 3 is a vertical central sectional view of one of the links of the sprocket chain. Fig. 4 is a detail view of mechanism for holding in various positions the pivoted tri-angular frame, taken on the line y—y in Fig. 2.

Referring by numerals to the drawings in which similar numerals denote corresponding parts in all the figures thereof, the numeral 1 designates the casing of our washing machine. 2 designates the supporting legs and 3 designates the hinged lid or cover.

The casing is formed with the two inclined end walls 4, to which are attached the rubbing strips or boards 5 which are composed of a series of ribs or corrugations. In the tapering or inclined receptacle thus provided is arranged the tri-angular frame composed of the side walls 6 and the connecting and bracing bars 7, and in the corners of the side walls are mounted the shafts 8, 9 and 10 the shaft 8 passing through the walls of the casing and receiving the crank 11 for revolving the shaft. On the shafts are rigidly mounted the sprocket wheels 12, which operate upon the sprocket chains 13, carrying on their upper sides the rubbing strips 14, the whole forming an endless rubbing band. The sprocket chains are of peculiar construction and form a very important feature of our invention and each link of the chain is formed with the socket or recess 15, to receive the teeth of the sprocket wheels, also with the hook 16 at one end and the slot 17 at the other end and on the upper side with the lugs 18 which are arranged at an incline and serve to retain the beveled lower portion of the rubbing strips and thus a durable and simple sprocket chain is provided and a perfect endless washing band is formed.

The shaft 9 is formed with the extended ends 19 which fit in the recesses 20, of the side walls of the casing and these ends are engaged by the pivoted plates 21, having the serrated edge 22, which holds the shaft at any adjustment; and arms, 23, are connected to the pivoted plates to move them when desired.

The plates 21 it will be noticed have their lower ends pivoted in the recess by the lower pin, seen in Fig. 4 and to the upper pin is connected the arm 23 for tilting or moving the plate. The lower end is thus pivoted and the upper end is moved by the arm 23.

In operating the frame is tilted upward and the clothes or fabrics are placed in the receptacle, then the frame is lowered and held by the pivoted plates or latches and when the shaft is turned by means of the crank the endless movable rubbing frame rubs the clothes between it and the rigid rubbing boards and effects the washing in a rapid and perfect manner and without damaging the clothes or fatiguing the operator.

We claim—

In a washing machine, the combination of a casing or housing having inclined end walls, corrugated strips secured to said walls, a triangular frame pivoted at one of the upper corners in the casing, shafts mounted in the corners of the frame and carrying sprocket wheels, one of the upper shafts passing through the casing at one end and carrying a crank, the shaft at the other upper corner extending beyond the frame, recesses in the side walls of the casing forming bearings for the ends of the shaft, pivoted plates having a serrated edge bearing against the ends of the shaft, arms connected to the plates for holding them in position, a sprocket chain passing over the sprocket wheels and having the inclined grasping lugs to hold the rubbing strips.

In testimony whereof we affix our signatures in presence of two witnesses.

JOHN W. BECWAR.
DAVID SHAW.

Witnesses:
  GEO. S. RIX,
  C. HOWARD BABCOCK.